US012038041B2

(12) United States Patent
Smith

(10) Patent No.: US 12,038,041 B2
(45) Date of Patent: *Jul. 16, 2024

(54) SELECTIVELY LOCKABLE BALL AND SOCKET JOINT

(71) Applicant: Medos International Sarl, Le Locle (CH)

(72) Inventor: Keanan R. Smith, Quincy, MA (US)

(73) Assignee: Medos International Sarl, Le Locle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,134

(22) Filed: May 9, 2023

(65) Prior Publication Data

US 2023/0272818 A1    Aug. 31, 2023

Related U.S. Application Data

(63) Continuation of application No. 17/548,273, filed on Dec. 10, 2021, now Pat. No. 11,668,340, which is a
(Continued)

(51) Int. Cl.
F16C 11/10    (2006.01)

(52) U.S. Cl.
CPC ........ F16C 11/106 (2013.01); *F16C 2316/10* (2013.01)

(58) Field of Classification Search
CPC ..... Y10T 403/32762; Y10T 403/32737; F16C 11/06; F16C 11/0604; F16C 11/0642; F16C 11/0652; F16C 11/106
See application file for complete search history.

(56) References Cited

U.S. PATENT DOCUMENTS 4,874,375 A    10/1989  Ellison
5,728,046 A    3/1998   Mayer et al.
(Continued)

FOREIGN PATENT DOCUMENTS

WO    2010121291 A1    10/2010
WO    2016131077 A1    8/2016

OTHER PUBLICATIONS

[No Author Listed] MIT Lateral Platform, "Surgical Technique Guide," DePuy Spine Inc., 2012.
(Continued)

*Primary Examiner* — Daniel J Wiley
(74) *Attorney, Agent, or Firm* — Barnes & Thornburg LLP

(57) ABSTRACT

A ball and socket joint assembly is disclosed that includes a body defining a cavity, a collet disposed in the cavity to receive a ball of a connector, and an actuator shaft coupled to the collet for rotating and translating the collet in the cavity. The cavity has a distal opening to accept the ball and an engagement feature extending into the cavity. The collet has an outer diameter larger than the opening in the body when the ball is disposed in the collet, and the collet has a corresponding engagement feature around at least a portion of the outer surface for receiving the engagement feature and converting rotation of the compression member into translation of the compression member along a proximal-distal axis of the body. The collet is compressed against the opening of the cavity when the collet is advanced distally against the opening.

21 Claims, 11 Drawing Sheets

Related U.S. Application Data continuation of application No. 16/698,433, filed on Nov. 27, 2019, now Pat. No. 11,204,060.

(56) References Cited

U.S. PATENT DOCUMENTS

| | | | |
|---|---|---|---|
| 5,876,332 A | 3/1999 | Looney | |
| 5,899,627 A | 5/1999 | Dobrovolny | |
| 5,931,777 A | 8/1999 | Sava | |
| 5,944,658 A | 8/1999 | Koros et al. | |
| 6,083,154 A | 7/2000 | Liu et al. | |
| 6,234,961 B1 | 5/2001 | Gray | |
| 6,254,532 B1 | 7/2001 | Paolitto et al. | |
| 6,322,500 B1 | 11/2001 | Sikora et al. | |
| 6,602,190 B2 | 8/2003 | Dobrovolny | |
| 6,951,538 B2 | 10/2005 | Ritland | |
| 7,179,261 B2 | 2/2007 | Sicvol et al. | |
| 7,491,168 B2 | 2/2009 | Raymond et al. | |
| 7,611,460 B2 | 11/2009 | Dobrovolny | |
| 7,918,792 B2 | 4/2011 | Drzyzga et al. | |
| 7,959,564 B2 | 6/2011 | Ritland | |
| 8,162,827 B2 | 4/2012 | Abdelgany et al. | |
| 8,202,216 B2 | 6/2012 | Melkent et al. | |
| 8,394,109 B2 | 3/2013 | Hutton et al. | |
| 8,409,087 B2 | 4/2013 | Ames et al. | |
| 8,469,960 B2 | 6/2013 | Hutton et al. | |
| 8,535,320 B2 | 9/2013 | Woolley et al. | |
| 8,636,655 B1 | 1/2014 | Childs | |
| 8,668,715 B2 | 3/2014 | Sandhu | |
| 8,715,175 B2 | 5/2014 | Assaker et al. | |
| 8,882,661 B2 | 11/2014 | Hutton et al. | |
| 8,894,573 B2 | 11/2014 | Loftus et al. | |
| 8,911,442 B2 | 12/2014 | Wing et al. | |
| 8,974,381 B1 | 3/2015 | Lovell et al. | |
| 9,050,146 B2 | 6/2015 | Woolley et al. | |
| 9,078,635 B2 | 7/2015 | Menendez et al. | |
| 9,216,016 B2 | 12/2015 | Flechter et al. | |
| 9,307,972 B2 | 4/2016 | Lovell et al. | |
| 9,386,971 B1 | 7/2016 | Casey et al. | |
| 9,414,828 B2 | 8/2016 | Abidin et al. | |
| 9,545,250 B2 | 1/2017 | Pfabe et al. | |
| 9,572,560 B2 | 2/2017 | Mast et al. | |
| 9,649,099 B1 | 5/2017 | Casey et al. | |
| 9,693,762 B2 | 7/2017 | Reimels | |
| 9,700,293 B2 | 7/2017 | Cryder et al. | |
| 9,801,667 B2 | 10/2017 | Hawkes et al. | |
| 9,844,400 B2 | 12/2017 | Stevenson et al. | |
| 9,907,583 B2 | 3/2018 | Hayes | |
| 9,962,147 B2 | 5/2018 | Casey | |
| 10,076,320 B2 | 9/2018 | Mast et al. | |
| 10,463,402 B2 | 11/2019 | Biester et al. | |
| 10,792,168 B2 | 10/2020 | Malcolmson et al. | |
| 11,204,060 B2 | 12/2021 | Smith | |
| 2005/0131408 A1 | 6/2005 | Sicvol et al. | |
| 2005/0228400 A1 | 10/2005 | Chao et al. | |
| 2005/0245929 A1 | 11/2005 | Winslow et al. | |
| 2006/0052671 A1 | 3/2006 | McCarthy | |
| 2007/0093823 A1 | 4/2007 | Booth et al. | |
| 2007/0213715 A1 | 9/2007 | Bridwell et al. | |
| 2008/0021285 A1 | 1/2008 | Drzyzga et al. | |
| 2009/0093684 A1 | 4/2009 | Schorer | |
| 2009/0105547 A1 | 4/2009 | Vayser et al. | |
| 2009/0149885 A1 | 6/2009 | Durward et al. | |
| 2009/0187080 A1 | 7/2009 | Seex | |
| 2009/0216087 A1 | 8/2009 | Bjork | |
| 2009/0254187 A1 | 10/2009 | Bjork | |
| 2010/0160975 A1* | 6/2010 | Biedermann | A61B 17/7037 606/305 |
| 2010/0317928 A1 | 12/2010 | Subramaniam | |
| 2011/0004248 A1 | 1/2011 | Abdou | |
| 2011/0034779 A1 | 2/2011 | Louftus et al. | |
| 2011/0137345 A1 | 6/2011 | Stoll et al. | |
| 2012/0089150 A1 | 4/2012 | Smith | |
| 2012/0179211 A1* | 7/2012 | Biedermann | A61B 17/7037 606/279 |
| 2012/0232350 A1 | 9/2012 | Seex | |
| 2014/0074166 A1 | 3/2014 | Scarrow et al. | |
| 2014/0194697 A1 | 7/2014 | Seex | |
| 2014/0277163 A1 | 9/2014 | Kretzer et al. | |
| 2014/0296917 A1 | 10/2014 | Donner et al. | |
| 2015/0148853 A1 | 5/2015 | Hawkes et al. | |
| 2015/0313585 A1 | 11/2015 | Abidin et al. | |
| 2016/0074029 A1 | 3/2016 | O'Connell et al. | |
| 2016/0106408 A1 | 4/2016 | Ponmudi et al. | |
| 2016/0296220 A1 | 10/2016 | Mast et al. | |
| 2016/0354073 A1 | 12/2016 | Nel et al. | |
| 2017/0014117 A1 | 1/2017 | Capote | |
| 2017/0014118 A1 | 1/2017 | Capote | |
| 2017/0014119 A1 | 1/2017 | Capote et al. | |
| 2017/0105770 A1 | 4/2017 | Woolley et al. | |
| 2017/0135735 A1 | 5/2017 | Hawkes et al. | |
| 2018/0116758 A1 | 5/2018 | Schlosser et al. | |
| 2018/0303473 A1 | 10/2018 | Spann et al. | |
| 2019/0090864 A1 | 3/2019 | Medeiros et al. | |
| 2019/0090979 A1 | 3/2019 | Medeiros et al. | |
| 2021/0156418 A1 | 5/2021 | Smith | |
| 2022/0099137 A1 | 3/2022 | Smith | |

OTHER PUBLICATIONS

[No Author Listed] [No Date Given] "NuVasive MAS TLIF Surgical Technique," (25 pages).

[No Author Listed] "NuVasive MAS TLIF 2 Surgical Technique," NuVasive Inc., 2016 (48 pages).

[No Author Listed] Pipeline Access System and CONCORDE, "Surgical Technique—Guide and Protect Catalogue," DePuy Spine Inc., 2011.

U.S. Appl. No. 16/698,433, filed Nov. 27, 2019, Selectively Lockable Ball and Socket Joint.

U.S. Appl. No. 17/548,273, filed Dec. 10, 2021, Selectively Lockable Ball and Socket Joint.

* cited by examiner

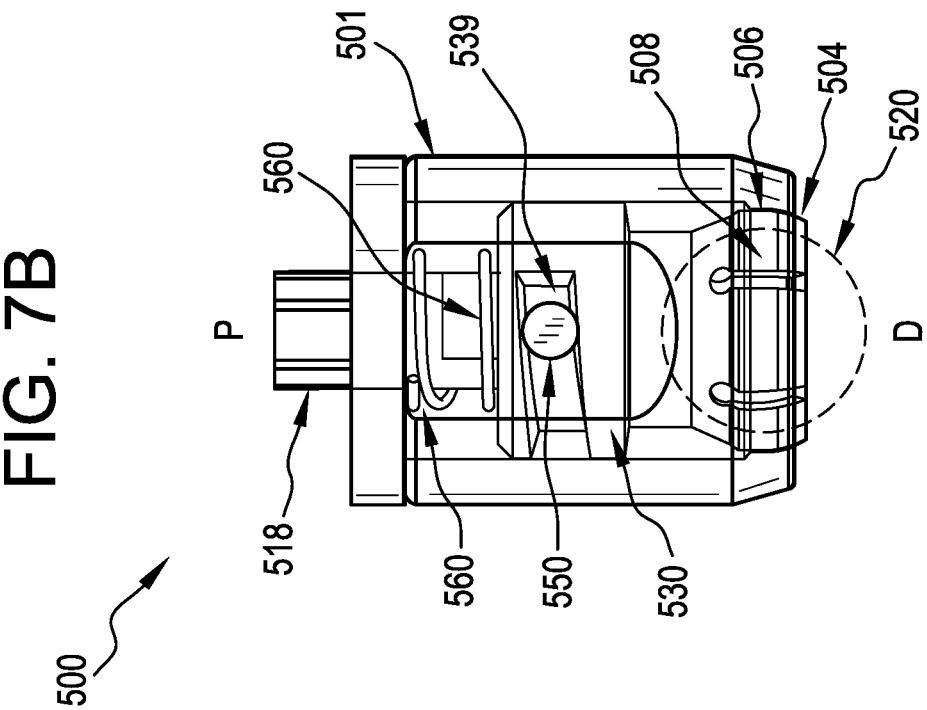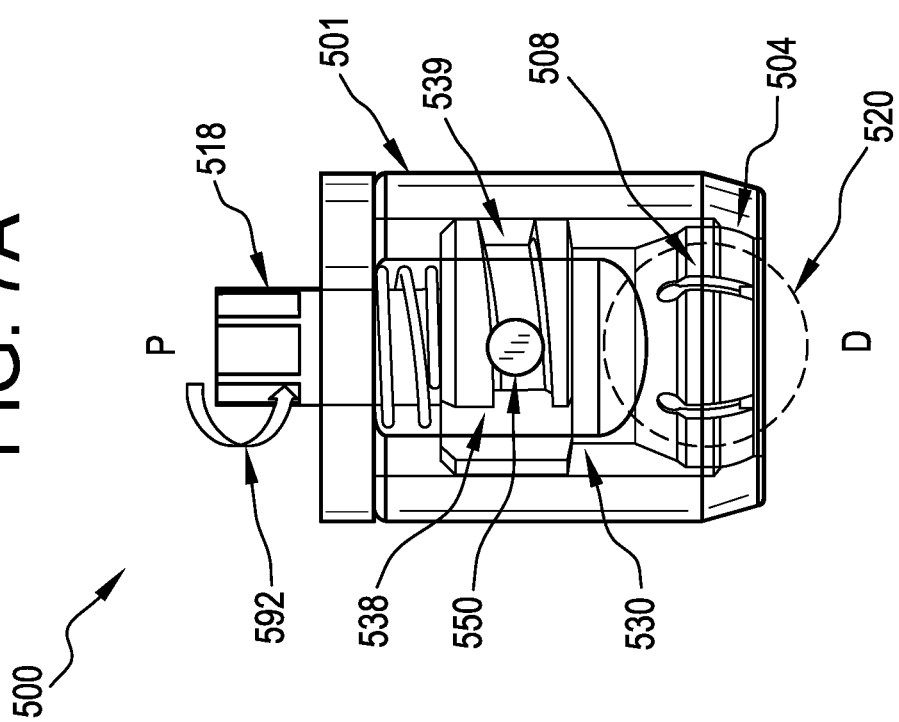

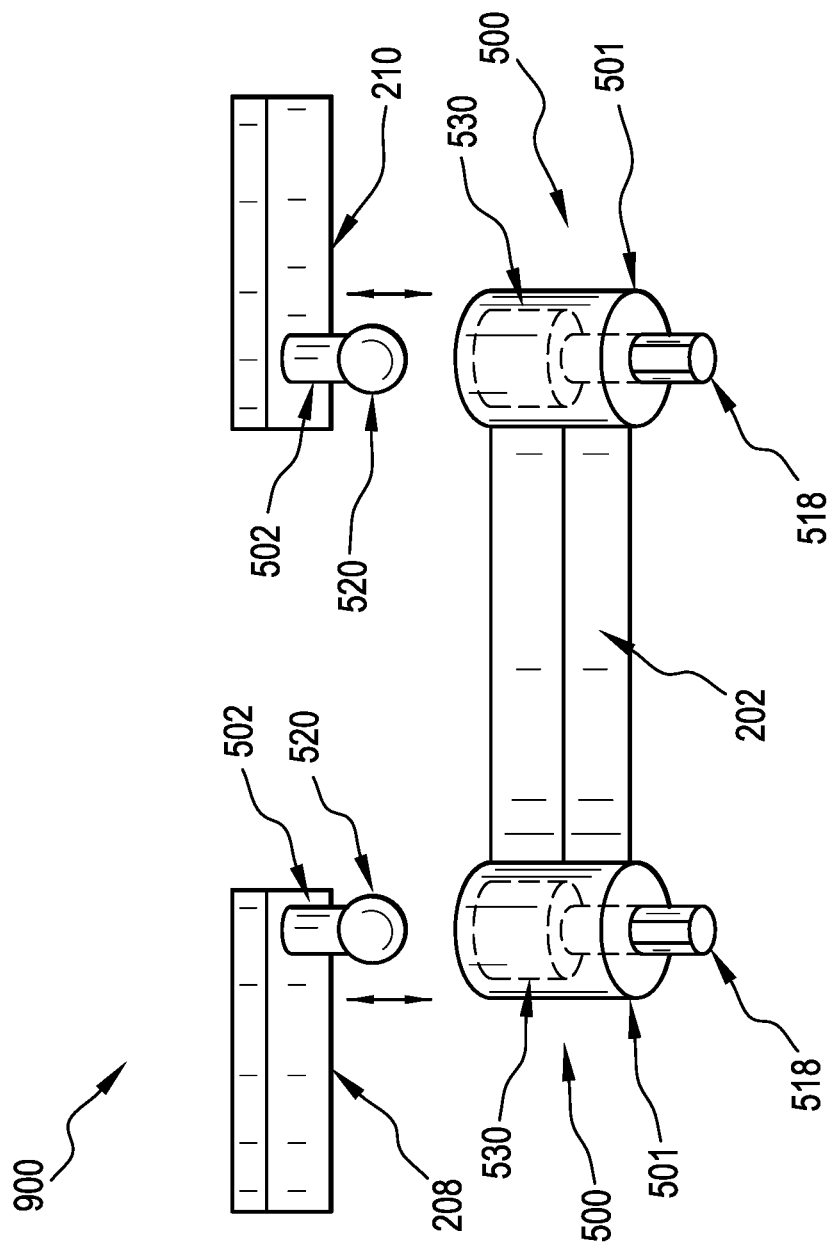

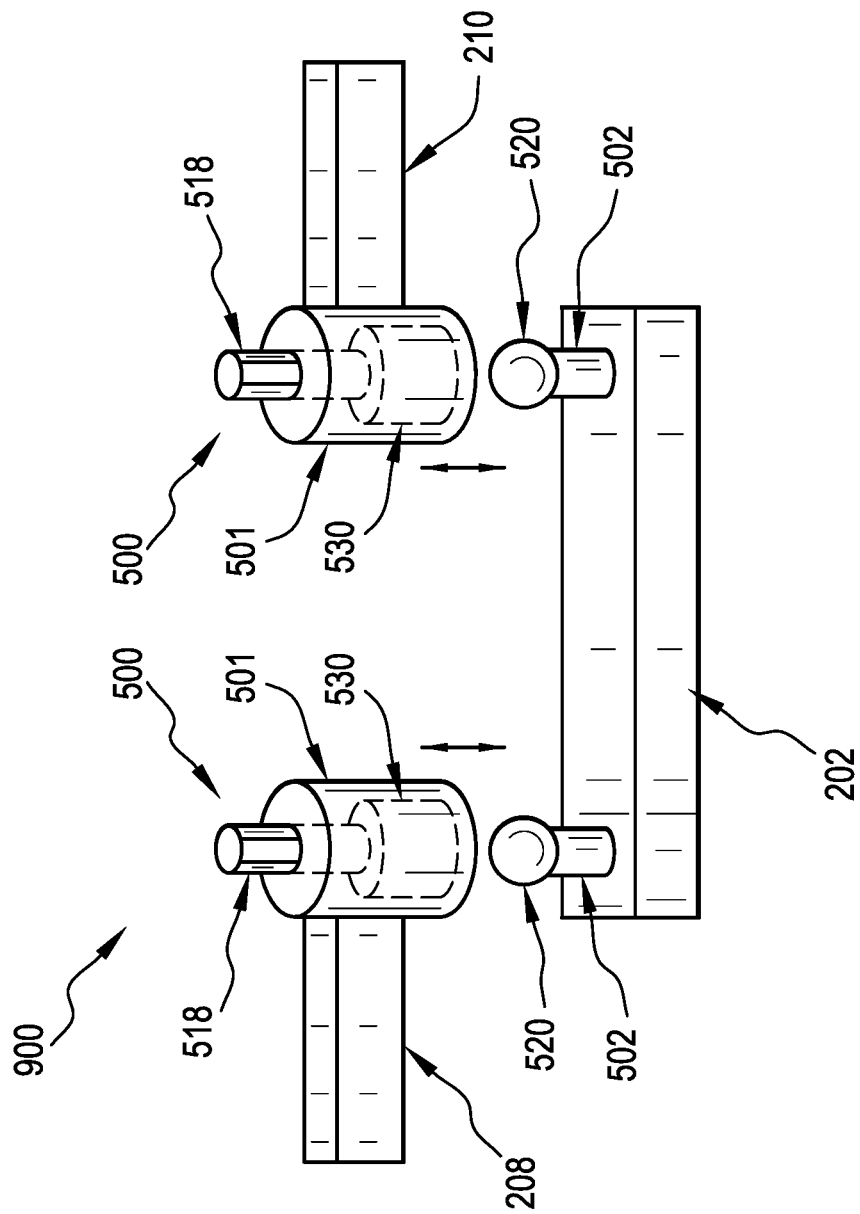

SELECTIVELY LOCKABLE BALL AND SOCKET JOINT

CROSS-REFERENCE TO RELATED APPLICATIONS

This application is a continuation of U.S. application Ser. No. 17/548,273, filed Dec. 10, 2021. U.S. application Ser. No. 17/548,273 is a continuation of U.S. application Ser. No. 16/698,433, filed on Nov. 27, 2019, and now issued as U.S. Pat. No. 11,204,060. The entire contents of each of these applications is incorporated by reference herein.

FIELD

This disclosure relates generally to surgical instruments, systems, and methods, and more particularly to instruments, systems, and methods including a ball and socket joint with a quick-locking and quick-releasing mechanism. Such instruments, systems, and methods can be used in various procedures, e.g., orthopedic or neurologic surgical procedures such as spinal fusion surgery.

BACKGROUND

Surgical procedures are used to treat and cure a wide range of diseases, conditions, and injuries. Surgery often requires access to internal tissue through open or minimally invasive surgical procedures. The term "minimally invasive" refers to all types of minimally invasive surgical procedures, including endoscopic, laparoscopic, arthroscopic, natural orifice intraluminal, and natural orifice transluminal procedures. Minimally invasive surgery can have numerous advantages compared to traditional open surgical procedures, including reduced trauma, faster recovery, reduced risk of infection, and reduced scarring.

Whether minimally invasive or not, there are a number of surgical procedures in which it can be desirable to form a working channel in a patient to provide access to a surgical site within the patient. One such example is orthopedic or neurologic surgical procedures, including, e.g., spinal fusion procedures where it can be desirable to form a working channel through a patient's tissue to access their vertebrae and/or the intervertebral discs disposed between adjacent vertebrae.

A variety of methods for providing such a working channel are known, including various devices that are anchored to a surgical table upon which a patient is disposed, devices that penetrate tissue without being anchored to any other structure, or devices that anchor to one or more anchors implanted in a patient's bone. In some arrangements a modular tissue retractor system can be employed in which one or more tissue retracting implements can be selectively coupled to a modular retractor body that is itself coupled to, for example, an implanted bone anchor.

Prior mechanisms for permitting polyaxial adjustment of tissue retracting implements relative to the retractor body can present challenges. For example, in some arrangements an expandable element coupled to the tissue retractor implement can be received within a socket formed in the retractor body. Such an arrangement can permit adjustment of the expandable element relative to the socket and selective locking of a particular orientation by actuation of the expandable element to interface with the walls of the socket. Actuation of the expandable element can be by rotation of a screw in some cases, and this can present challenges in that multiple rotations of the screw can be required to achieve acceptable locking levels that resist the forces imparted to the tissue retracting implements by abutting tissue. Further, in some cases the actuating screw can be coupled to the tissue retracting implement, such that a user might move the implement during actuation. Still further, operation of such an arrangement can be complex, e.g., actuation of the screw can be required to achieve any degree of locking, even provisional locking force that still allows some adjustment of tissue retracting implement positioning by a user.

Accordingly, there is a need for improved access devices, systems, and methods that can streamline the instrumentation and methodology of various surgical procedures. For example, there is a need for improved polyaxial restraint and locking of components of surgical retractor assemblies. Additionally, there is a need for locking assemblies that both enable easy assembly and polyaxial retention of retractor components while achieving acceptable lockout levels with simple operation.

SUMMARY

Surgical instruments, systems, and methods are disclosed herein that provide improved polyaxial restraint and locking of components of surgical retractor assemblies. For example, the embodiments described herein provide selectively lockable ball-and-socket joints that can be used to couple, for example, tissue retracting implements to modular retractor bodies. The embodiments described herein can provide a number of advantages over prior approaches. This can include, for example, the ability to quickly couple and decouple tissue retracting implements to a retractor body, the ability to impart a provisional locking or drag force to a coupled tissue retracting implement without requiring actuation of a locking element, e.g., a screw, and ability to achieve selective locking with sufficient locking strength with minimum movement, e.g., less than one rotation of a locking actuator.

In one aspect a ball and socket joint assembly includes a body defining a cavity and a distal opening to the cavity, a compression member disposed in the cavity, and an actuator shaft extending through a proximal end of the housing, the actuator shaft coupled to the compression member and permitting rotation and translation of the compression member in the cavity.

The distal opening an have a diameter larger than a diameter of a spherical portion of a connector and less than a diameter of an inner wall of the cavity proximal to the opening. The body can include an engagement feature extending into the cavity. A distal end of the compression member can include a collet configured to accept the spherical portion of the connector, and the collet can define an outer diameter that is configured to be larger than the diameter of the opening in the body when the spherical portion is disposed in the collet. The compression member can include an outer surface defining a corresponding engagement feature around at least a portion of the outer surface for receiving the engagement feature of the body for converting rotation of the compression member into translation of the compression member along a longitudinal axis of the body. The collet can be configured to be compressed against the opening of the cavity when the receiver is advanced distally against the opening.

In some instances, after inserting the spherical portion of the connector into the collet, rotation of the actuator shaft in a first direction rotates the compression member and engagement between the engagement feature and the locking channel advances the compression member distally, and, when advanced distally, the collet engages the opening of the cavity and locks the collet about the spherical portion. The cavity can define an outwardly tapered inner wall region extending proximally from the distal opening.

A distal end of the collet can define a plurality of resilient fingers each having a tapered exterior surface configured to interface with the outwardly tapered inner wall region of the cavity when the receiver is advanced distally such that the outwardly tapered inner wall region constricts the plurality of resilient fingers.

The engagement feature can be a cam pin and the corresponding engagement feature can include an angled locking channel sized and shaped to receive the cam pin. The angled locking channel can define a variable pitch to provide a variable mechanical advantage during rotation of the compression member with respect to the cam pin, when the cam pin is disposed in the angled locking channel.

The outer surface of the compression member can include an axial channel for receiving the cam pin and allowing the compression member to translate freely along the proximal-distal axis in the cavity, and the locking channel can extend from the axial channel and be angled proximally from the axial channel.

The assembly can include a spring disposed in the housing, the spring being coupled to the body and the receiving member for biasing the compression member towards the distal opening. In some instances, the spring is configured to urge the collet against the distal opening and impart a drag force on the spherical portion for resisting polyaxial movement of the spherical portion about the collet. The spring can be configured to urge the collet against the distal opening and impart a retaining force on the spherical portion.

In some instances, the engagement feature includes a threaded portion of the inner wall of the cavity, and the angled locking channel includes a corresponding threaded portion of the outer wall of the compression member, where the compression member is in threaded engagement with the body.

The collet can be configured to passively secure the spherical portion of the connector without engaging the opening of the body. In some instances, the collet is configured to extend distally beyond a maximum diameter location of the spherical portion of the connector. In some instances, the collet defines a distal opening having an inner diameter less than a maximum inner diameter of the collet. In some instances, the collet includes a central through-hole adapted to receive the actuator shaft.

Another example of the present disclosure is a surgical instrument having a retractor body configured to couple to an implantable anchor, with the retractor body including a first connector and a second connector each having a spherical portion, a first tissue manipulating implement coupled to the first connector of the retractor body and capable of polyaxial movement relative thereto, and a second tissue manipulating implement coupled to the second connector retractor body and capable of polyaxial movement relative thereto. Where each of the first and second tissue manipulating implements couples to the corresponding connector via a ball and socket joint assembly having aspects of the present disclosure, where each tissue manipulating implement includes the body of the ball and socket joint assembly. In some instances, the connector includes an extension post coupled to the retractor body. In some instances, the extension post pivots relative to the body.

Yet another example of the present disclosure is a method of assembling a surgical instrument including inserting a spherical portion of a connector into a collet of a compression member disposed within a cavity of a body, the connector being attached to an arm of a surgical retractor, the ball-shaped end passing through a distal opening to the cavity that has a diameter larger than a diameter of a spherical portion of a connector and less than a diameter of an inner wall of the cavity proximal to the opening, rotating an actuator shaft that is coupled to the compression member in a first direction, the actuator shaft rotating the compression member with respect to an engagement feature of the body that extends into the cavity, the engagement feature interfacing with the compression member such that the rotation of the compression member urges the compression member distally in the cavity, and continuing to rotate the actuator shaft until an outer surface of the collet is compressed against the opening of the cavity and an inner surface of the collet is compressed around the spherical portion to retain the spherical portion in the collet.

In some instances, inserting the spherical portion into the collet includes urging the compression member proximally against a spring force, where the spring force urges the compression member distally towards the opening after the inserting. In some instances, the spring force urges the collet distally against the distal opening and imparts a provisional retaining force to the spherical portion. In some instances, the provisional retaining force serves to impart a drag force on the spherical portion to resist polyaxial movement of the spherical portion about the collet.

Rotating the actuator shaft can include threading the compression member inside the cavity. In some instances, continuing to rotate the actuator shaft includes adjusting a degree of frictional resistance to polyaxial movement of the spherical portion in the collet. In some instances, the method further includes rotating the actuator shaft in a second direction to urge the compression member proximally in the cavity until the spherical portion can be removed from the collet and pass through the opening of the cavity.

Any of the features or variations described above can be applied to any particular aspect or embodiment of the present disclosure in a number of different combinations. The absence of explicit recitation of any particular combination is due solely to the avoidance of repetition in this summary.

BRIEF DESCRIPTION OF DRAWINGS

This disclosure will be more fully understood from the following detailed description taken in conjunction with the accompanying drawings, in which:

FIG. 7A is a partially-transparent detail view of the ball and socket joint assembly of FIGS. 5A and 5B showing the initiation of a locking operation;

FIG. 7B is a partially-transparent detail view of the ball and socket joint assembly of FIG. 7B illustrating the assembly in a locked position;

FIG. 9A is an illustration of one embodiment of a retractor body and tissue retracting implements of a surgical instrument assembly being connected by embodiments of the ball and socket joints disclosed herein; and FIG. 9B is an illustration of another embodiment of a retractor body and tissue retracting implements of a surgical instrument assembly being connected by embodiments of the ball and socket joints disclosed herein.

DETAILED DESCRIPTION

Figure 1:
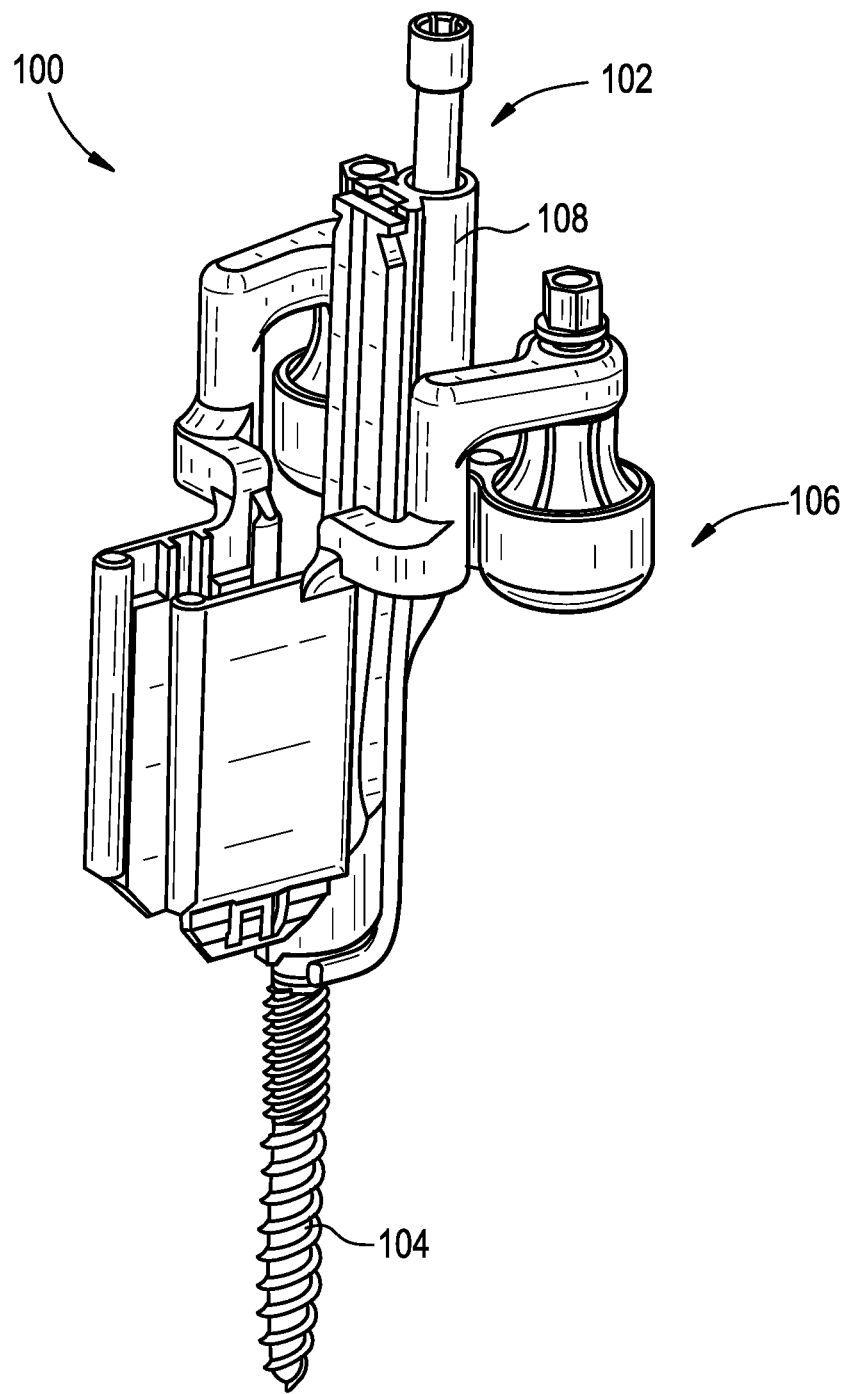
FIG. 1 is an illustration of one embodiment of a surgical instrument assembly according to the teachings provided herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Additionally, to the extent that linear or circular dimensions are used in the description of the disclosed devices and methods, such dimensions are not intended to limit the types of shapes that can be used in conjunction with such devices and methods. Equivalents to such linear and circular dimensions can be determined for any geometric shape. Further, in the present disclosure, like-numbered components of the embodiments generally have similar features. Still further, sizes and shapes of the devices, and the components thereof, can depend at least on the anatomy of the subject in which the devices will be used, the size and shape of components with which the devices will be used, and the methods and procedures in which the devices will be used.

FIGS. 1-4 illustrate an exemplary surgical instrument assembly 100 according to the teachings provided herein. The assembly 100 can be used in various surgical procedures, including spinal surgeries such as microsurgical bone resection, spinal decompression, spinal fusion, and the like. In general, the assembly 100 can include a support instrument 102 that couples to an implanted anchor 104, such as a pedicle or other bone screw. The assembly 100 can further include a retractor 106 coupled to the support instrument 102. Other components not illustrated here can be included or coupled to the assembly 100. Such components can include, for example, any of a variety of cameras or visualization systems, and any of a variety of other surgical instruments.

An exemplary method of using the assembly 100 of FIGS. 1-4 can include any one or more of the following steps, performed in any of a variety of sequences: a) making an incision in a skin of a patient; b) percutaneously inserting through the incision an implantable anchor, such as a pedicle or other bone screw; c) coupling the support instrument 102 to the implanted anchor (e.g., a pedicle anchor); d) coupling a tissue retractor to the instrument; e) providing medial-lateral retraction of tissue surrounding an incision; f) coupling an optical visualization instrument to the tissue retractor and/or instrument; g) resecting a portion of the superior articular process, and/or performing a microsurgical decompression procedure; h) extracting intervertebral disc material including removing cartilaginous material from the vertebral endplates; i) inserting an interbody device; and j) deploying a mechanism of stabilization to stabilize the intervertebral segment.

The above described retractor assembly 106, in combination with the support instrument or anchor extension 102 and implanted anchor 104, can be used to, for example, widen an incision formed in a patient's skin and tissue to enable better access to a surgical site. By way of further example, in some embodiments these components can form an assembly that is anchored to a single implanted screw or anchor and provides medial-lateral tissue retraction to increase access for a variety of surgical procedures. Medially and laterally retracting skin and underlying tissue surrounding an incision can provide a wider opening and working channel between the tissue manipulating implements to access the patient's spine or intervertebral space. In some embodiments, the working channel can extend to encompass an adjacent anchor implanted in an adjacent vertebra. Once the tissue of the incision walls is retracted to form the working channel, any of a variety of surgical procedures can be performed by introducing one or more instruments through the working channel defined by the tissue manipulating implements of the retractor assembly. For example, procedures on the intervertebral disc space, such as disc replacement, discectomy, endplate preparation, fusion cage insertion, bone graft delivery, and the like can be performed by passing instruments or implants through the working channel.

Returning to FIGS. 1-4, FIG. 1 illustrates one embodiment of a surgical instrument assembly 100 that includes a support instrument 102 coupled to an implantable anchor 104 and a tissue retractor 106. Further details regarding embodiments of the assembly 100 can be found in U.S. application Ser. No. 16/139,409, entitled "PATIENT-MOUNTED SURGICAL SUPPORT," now issued as U.S. Pat. No. 10,945,773, as well as U.S. application Ser. No. 16/139,434 entitled "PATIENT-MOUNTED SURGICAL RETRACTOR," now published as US-2019-0090864-A1, both of which were filed on Sep. 24, 2018. Further details regarding embodiments of the implantable anchor 104 can be found in U.S. application Ser. No. 15/208,872, filed on Jul. 13, 2016, and entitled "BONE ANCHOR ASSEMBLIES AND RELATED INSTRUMENTATION," now issued as U.S. Pat. No. 10,463,402. Furthermore, details regarding certain embodiments of retractors that can be used in the surgical assembly 100 can be found below and in U.S. Pat. No. 7,491,168. The entire contents of each of these references are incorporated by reference herein.

Figure 3:
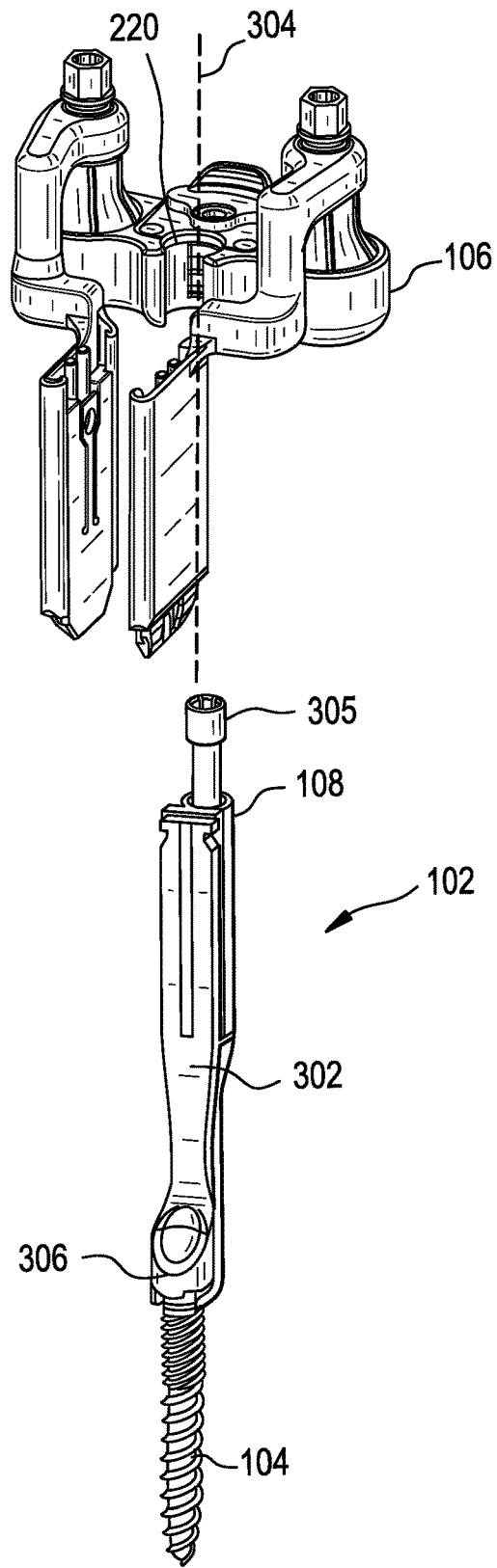
FIG. 3 is an exploded view of the assembly of FIG. 1.

Generally, the support instrument can include an elongate body 108 with a laterally-extending fork formed at a distal end thereof that can interface with a narrowed neck of the anchor 104. The fork can include opposed projections that extend laterally from a distal portion of the elongate body and define a U-shaped or otherwise open-ended recess that can be sized to receive a portion of the implantable anchor 104. For example, the projections can be configured to fit around a proximal portion of a bone anchor that can be part of a modular mono- or polyaxial pedicle screw. Such anchors can include a generally cylindrical distal shank portion with threads for tapping into bone, as well as a narrowed neck proximal of the shank portion and a wider proximal head. The proximal head can be generally spherical or semi-spherical in shape and can be configured to couple with a receiver head before or after implantation in a patient's bone. The elongate body can also include a lock configured to exert a drag force on the head of the anchor to control polyaxial movement of the instrument 102 relative to the anchor 104. As shown in FIG. 3, the lock can include a lock body 302 that is coupled to the elongate body 108 and translatable relative thereto along a longitudinal axis 304 of the elongate body. The lock body 302 can have a generally elongate shape to facilitate coupling with and translating or sliding along or relative to the elongate body 108. The lock can be actuated by a lock screw 305 that can cause distal translation of the lock body 302 as the screw is threaded further into the elongate body 108. The lock body 302 can further include a laterally-extending ring-shaped projection 306 at a distal end thereof that can be configured to contact the proximal head of the anchor 104 and exert a drag force thereon. The ring-shaped projection 306 can define a lumen to maintain access to a drive feature formed on a proximal end of the head of the anchor 104. This lumen, in combination with the lateral extension of the projection 306 and the fork formed at the distal end of the elongate body 108 can orient the instrument 100 such that a longitudinal axis of the instrument is laterally offset or non-coaxial with a longitudinal axis of the anchor 104. Such a configuration can allow a driver or other instrument to access the drive feature of the anchor 104 even when the instrument 100 is coupled thereto. This can enable flexibility to implant the anchor 104 any of before and after coupling the instrument 100 thereto.

Returning to FIG. 2, a more detailed illustration of one embodiment of the tissue retractor 106 is provided. The retractor 106 can include a body 202 that can be configured to couple to the support instrument or anchor extension 102. First and second tissue manipulating implements 204, 206 can be coupled to the body 202 by, for example, rigid arms 208, 210, respectively. Each of the first and second tissue manipulating implements 204, 206 can be capable of polyaxial movement relative to the body via a polyaxial joint 212, 214, such as a ball-and-socket joint. Such a joint can allow the tissue manipulating implements 204, 206 to move relative to one another in a variety of manners. For example, the implements 204, 206 can be pivoted toward or away from one another about an axis extending parallel to a longitudinal axis of a support instrument 102, (e.g., an axis parallel to the axis 304 in FIG. 3). The implements 204, 206 can also be pivoted toward or away from one another about an axis transverse or oblique to, e.g., the axis 304. For example, the implements 204, 206 can be toed relative to one another, where distal ends of the implements are moved toward or away from one another by an amount greater than proximal ends of the implements. In some embodiments, toeing can include moving distal ends of the implements away from one another while proximal ends of the implements are either moved toward one another or do not move such that a distance between the proximal ends of the implements remains unchanged. Furthermore, each polyaxial joint 212, 214 can include a lock 216, 218 that can be used to selectively lock a position of the associated tissue manipulating implement 204, 206 or impose a drag force to inhibit movement in the absence of at least a threshold level of force.

Figure 2:
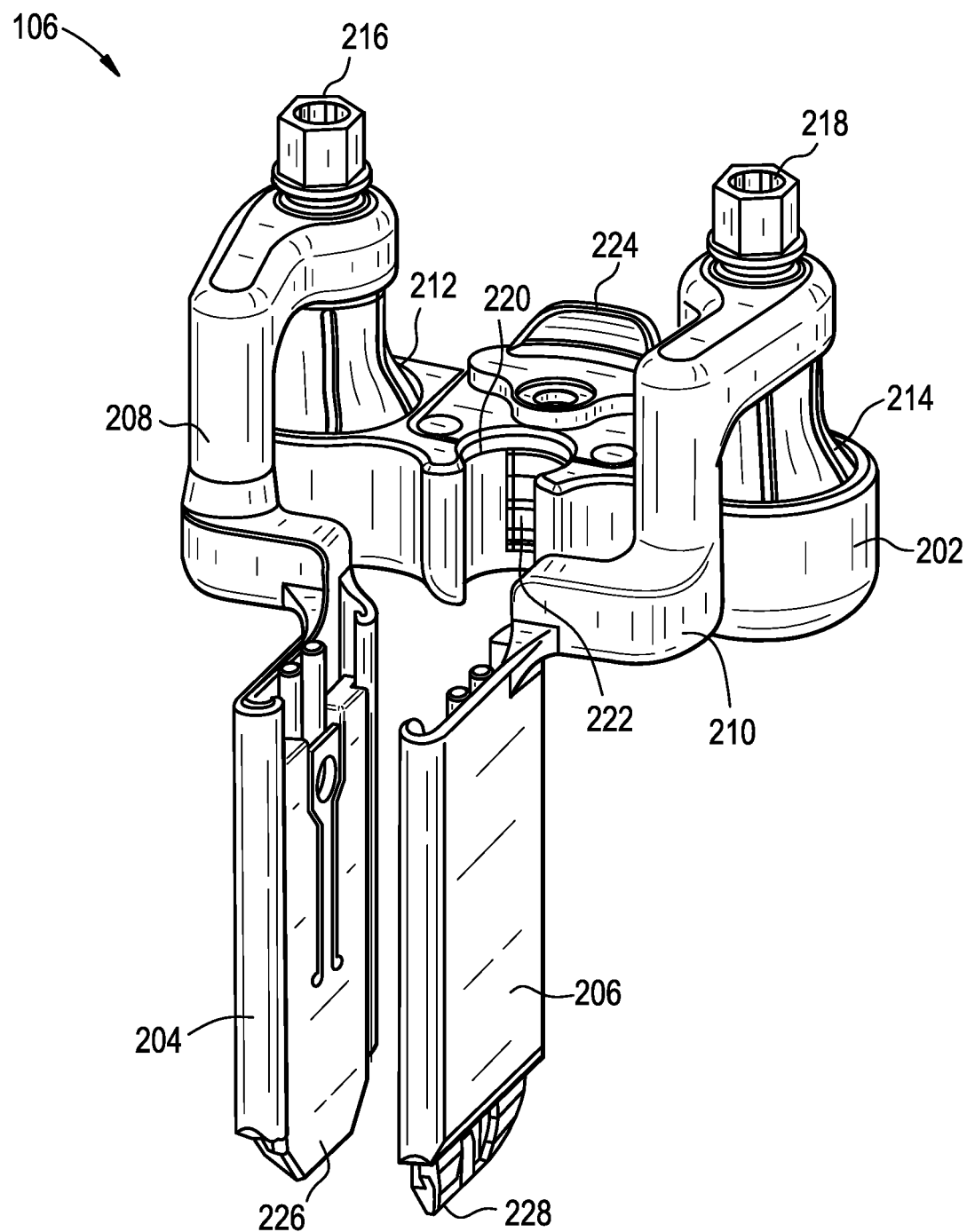
FIG. 2 is a detail view of a retractor of the assembly of FIG. 1.

As noted above, the tissue retractor 106 can be configured to couple to a support instrument or anchor extension 102 and can be configured to slide along a length of such an instrument to adjust a height of the retractor relative to the implanted anchor 104. As shown in FIG. 2, the body 202 of the retractor can include a closed or partially-open lumen or recess 220 configured to receive a portion of the support instrument 102, such as a generally cylindrical elongate body 108 (see FIG. 1). The retractor 106 can further include a feature to selectively lock a position of the retractor relative to the support instrument 102, such as a spring-biased protrusion or pawl 222 that can engage a ratchet rack or other series of recesses or other surface features formed on the elongate body 108 of the support instrument. Furthermore, in some embodiments the locking feature 222 can be configured to prevent not only movement along a length of the support instrument 102, but also rotation thereabout. An actuator 224, such as the illustrated sliding or translating member, can be included to allow a user to easily withdraw the protrusion 222 against the biasing force of a spring or other biasing element disposed within the body 202 of the retractor 106.

In addition to adjusting a position of the retractor 106 along a length of the support instrument 102, a length of each of the tissue manipulating implements 204, 206 can also be adjusted. For example, in some embodiments the tissue manipulating implements 204, 206 can each include an extension 226, 228 that can be configured to translate relative to the tissue manipulating implements 204, 206. Proximally or distally translating either extension 226, 228 relative to the associated implement 204, 206 can change an overall length of the implement and, for example, can allow an implement to reach deeper into tissue even if the retractor 106 is mounted at a greater height above a patient's skin surface along a more proximal portion of the support instrument elongate body 108.

FIG. 3 illustrates a partially exploded view showing how the retractor 106 can be coupled to the support instrument 102 by sliding the retractor down or distally over a proximal portion of the support instrument. For example, the recess or lumen 220 of the retractor 106 can be aligned with the generally cylindrical elongate body 108 of the support instrument and the retractor can be advanced down or distally along the axis 304. While advancing the retractor relative to the support instrument, a user can manually retract the spring biased pawl or protrusion 222 using the sliding lever 224 to allow free movement of the retractor relative to the support instrument. When a desired position is reached, the user can release the lever 224 such that the protrusion 222 is advanced into engagement with a complementary recess or other feature formed on the elongate body 108 to maintain the relative positioning of the retractor and support instrument. In other embodiments, the complementary features formed on the elongate body 108 and the protrusion 222 can be formed as a biased ratchet where, e.g., distal advancement of the retractor can be achieved without actuating the lever 224, but proximal withdrawal of the retractor 106 relative to the instrument 102 requires actuating the lever 224 to withdraw the biased protrusion 222.

Figure 4:
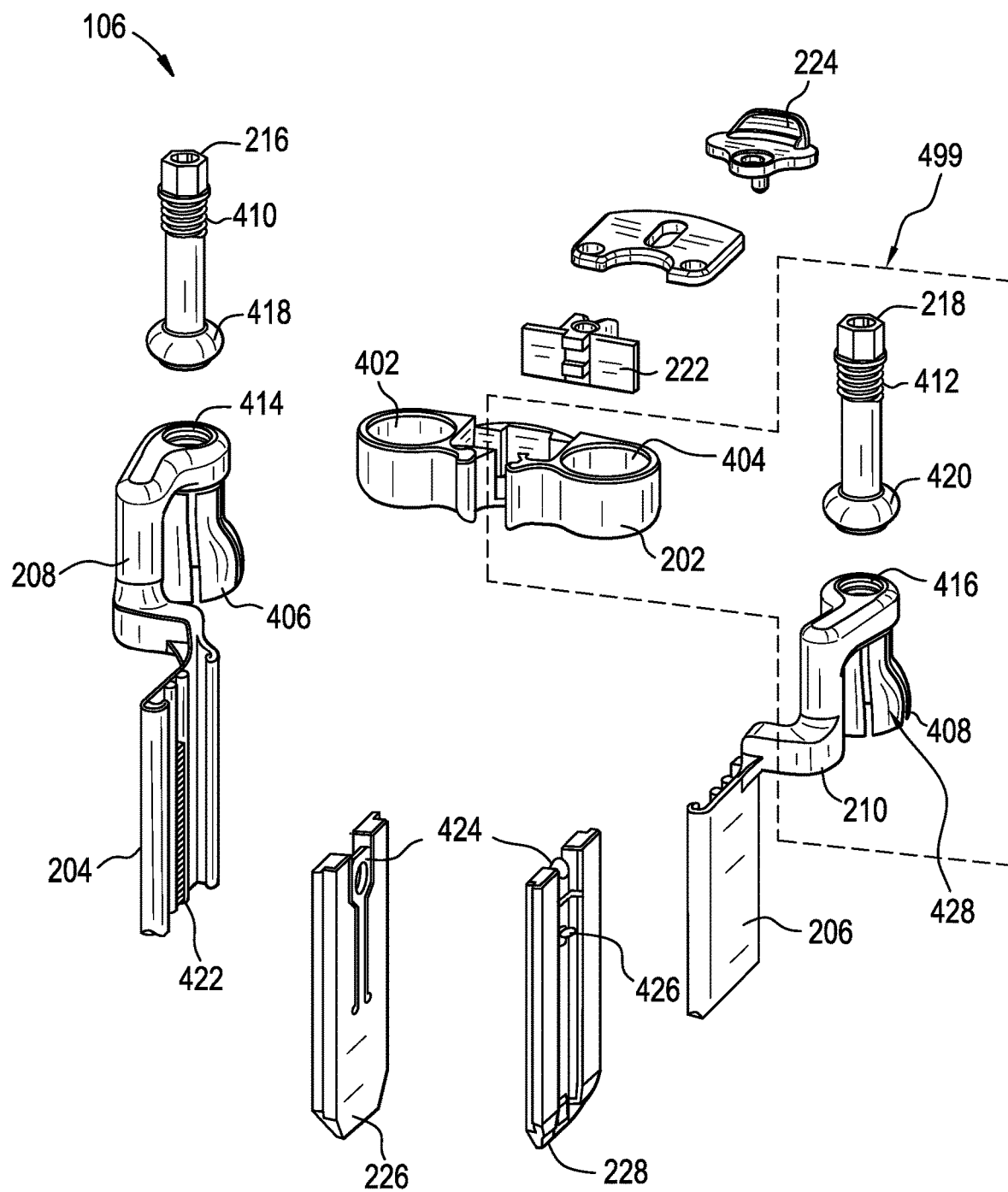
FIG. 4 is an exploded view of the retractor of FIG. 2.

FIG. 4 illustrate the retractor 106 in various exploded and partially transparent views to better explain the interaction of various components thereof. For example, the polyaxial joints 212, 214 can be seen in greater detail. Each polyaxial joint 212, 214 can include a socket 402, 404 formed in the body 202 of the retractor 106. Each of the arms 208, 210 coupled to the tissue manipulating implements 204, 206 can have a generally ball-shaped proximal end 406, 408 that includes one or more relief slots formed therein such that various portions of the proximal end (e.g., petals 428) can deform relative to other portions thereof. A lock 216, 218 can be coupled to each arm 208, 210 by cooperation between threads 410, 412 formed on the lock and threads 414, 416 formed on an inner surface of through-holes in the arms 208, 210. Further, an expanding member 420 can be disposed at a distal end of each lock 216, 218 and arranged within the ball-shaped proximal end 408 such that adjustment of the lock 218 position by movement along the threads 412 can moves the expanding member 420 distally within the ball-shaped proximal end 408 such that it urges the petals 428 outward or the expanding member 420 can be retracted proximally such that it sits more in a curved inside surface of the petals 428 and does not urge them outward from a resting position.

When assembled, with the expanding members 418, 420 disposed within the generally ball-shaped proximal ends 406, 408 in an un-locked (e.g., retracted or resting) position, the expanding members 418, 420 can be disposed within one of the sockets 402, 404 of the body 202 to enable a locking function. In use, as the locks 216, 218 are rotated relative to the arms 208, 210, they can advance the expanding member 420 farther into the ball-shaped proximal end 408 due to the threaded coupling between the arms 208, 210 and the locks 216, 218. Advancement of the locks 216, 218 into the ball-shaped proximal end 408 can cause the expanding member 418, 420 formed at a distal end of each lock to expand the petals 428 radially outward inside the sockets 402, 404. As the petals 428 of the ball-shaped proximal ends 406, 408 expand radially, they are urged into contact with the sidewalls of the sockets 402, 404. This can cause an increase in frictional force between the sockets 402, 404 and the ball-shaped proximal ends 406, 408 of the arms 208, 210. Further, upon sufficient advancement of the locks 216, 218, the force of the expanding members 418, 420 against the petals 428 can effectively lock the ball-shaped proximal ends 406, 408 in a given position and thereby prevent any movement of the arms 208, 210 or tissue manipulating implements 204, 206 coupled thereto.

The embodiment illustrated in FIGS. 1-4 can present certain challenges in use, however. For example, in some cases achieving sufficient frictional or lockout force to resist reaction forces imparted onto the tissue manipulating implements by retracted tissue can require multiple complete rotations of the locks 216, 218. Further, in some cases actuating the locks 216, 218 that are coupled to the tissue manipulating implement arms can cause unintended movement of the tissue manipulating implement. Still further, in some cases achieving even a provisional level of locking between the ball-shaped proximal ends 406, 408 and the sockets 402, 404 can require some actuation of the locks 216, 218, which can complicate a surgical procedure by requiring more steps and hands to position a tissue manipulating implement, provisionally lock its position such that it does not move unless a force is imparted by a user, possibly readjust positioning (perhaps many times), and finally fully lock positioning.

A ball and socket joint is one method for positioning a screw mounted retractor. Examples of the present disclosure provide for a ball and socket joint that includes structure for capturing and locking the ball orientation with sufficient force to resist reaction forces imparted by muscle/tissue. Additionally, the examples of the ball and socket joints can be easily assembled and disassembled in order to allow positioning of the retractor for the surgeon. Accordingly, the above described retractor assembly 106 can be constructed with an alternate polyaxial joint design, which replaces the polyaxial joint assembly 499 shown in FIG. 4. The polyaxial joint assembly 499 includes at least a portion of the arm 210 with the ball-shaped proximal end, the lock 218 and the ball-shaped expanding end 420, and at least a portion of the body 202 with the socket 404. One such alternate polyaxial joint assembly is the ball and socket joint assembly 500 illustrated in FIGS. 5A-8 and described below.

Figure 5B:
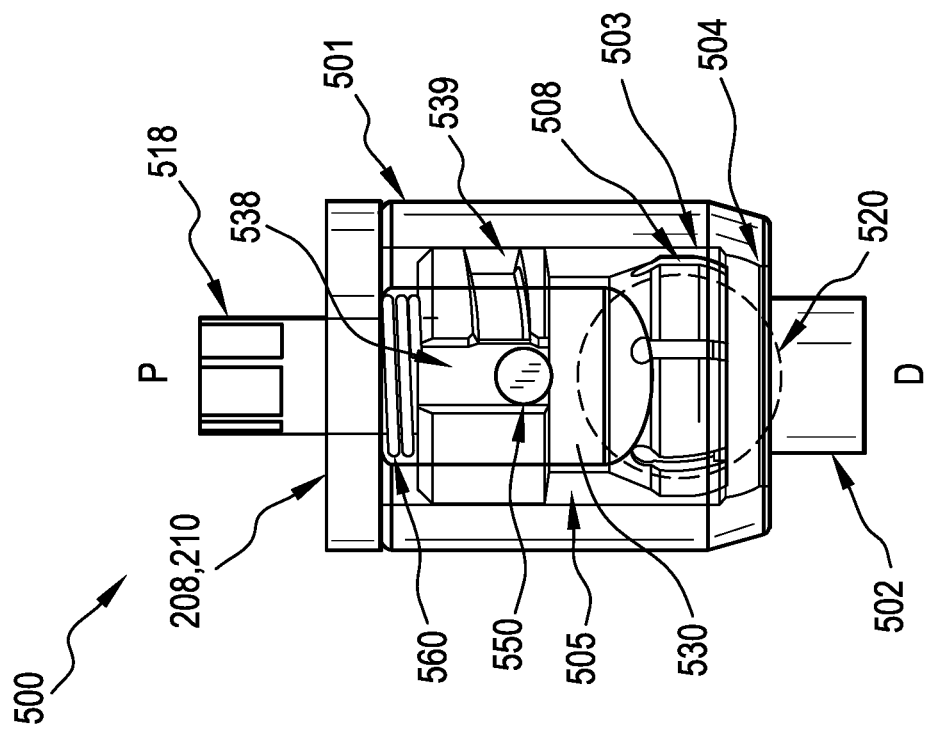
FIG. 5B is a partially-transparent detail view of the ball and socket joint assembly of FIG. 5A, showing the ball connector coupled to a collet of the assembly.
Figure 5A:
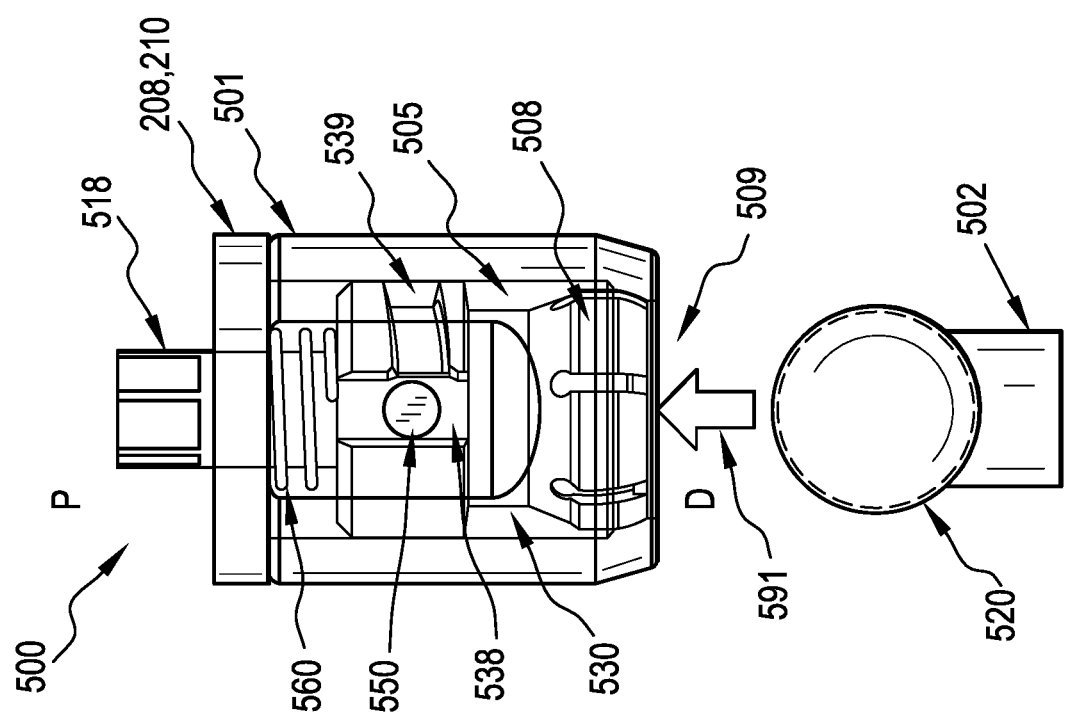
FIG. 5A is a partially-transparent detail view of one embodiment of a selectively lockable ball and socket joint assembly representing an alternate design for the polyaxial joints of the retractor of FIG. 2.

FIGS. 5A and 5B are partially-transparent detail views of a ball and socket joint assembly 500 as an alternate design for the polyaxial joints of the retractor of FIG. 2. The ball and socket joint assembly 500 includes a housing 501 that has an open distal end 509 and an internal cavity 505 containing a compression member 530 that is configured to move axially (i.e., along the proximal (P)-distal (D) axis) inside the cavity 505. The compression member 530 includes a collet 508 that is configured to receive the ball-shaped end 520 of a connector 502, as illustrated by arrow 591 in FIG. 5A and subsequently shown disposed in the collet in FIG. 5B. In operation, because the outer diameter of the collet 508 is larger than the diameter of a lip 504 of the inner wall of the cavity 505 when the ball-shaped end 520 of the connector 502 is disposed in the collet, when the compression member 530 is translated distally relative to the housing 501, the outer surface of the collet 508 is engaged by the lip 504 to collapse the collet 508 around the ball-shaped end 520, creating a friction fit. Accordingly, a proximal inner wall region 503 of the cavity 505 defines a larger diameter section than the lip 504 to allow the collet 508 to flex radially outward to accept the ball-shaped end 520 when the compression member is disposed proximally, as shown in FIG. 5B.

In some examples, the ball and socket joint assembly 500 includes a spring 560 disposed in the cavity 505 for distally biasing the compression member 530 against the lip 504 of the opening 509, as illustrated in FIG. 5A. In some examples, and as illustrated, the housing 501 includes an engagement feature or protrusion extending into the cavity 505, such as a cam pin 550. Additionally, the compression member 530 includes an axial track 538 for receiving the cam pin 550 and allowing axial translation of the compression member 530 in the cavity 505 of the housing 501. In some examples, the compression member 530 further includes an angled track 539 for the cam pin 550 that extends from the axial track 538, such that the angled track 539 enables rotation of the compression member 530 in the housing and the angle of the angled track 539 advances the compression member distally against the lip 504 when the cam pin 550 is rotated out of the axial track 538 and along the angled track 539.

FIG. 5A shows the assembly 500 in a default position. While the cam pin 550 is aligned to the axial channel 548, and the spring 560 has driven the collet 508 of the compression member 530 distally against the lip 504 of the housing 501. In some examples, the only distal force on the collet 508 comes from the spring 560, whereby insertion of the ball-shaped end 520 into the collet 508 can be achieved simply by pushing the ball-shaped end 520 proximally into the opening 509 of the housing 501 until the ball-shaped end 520 is received by the collet 508. Thereafter, the spring 560 can urge the compression member 530 distally until the collet 508 is engaged with the lip 504, which can provide a degree of frictional locking of the ball-shaped end 520 in the collet 508. This frictional locking, or drag force, can provisionally lock a position of the ball-shaped end 520 relative to the collet 508 and assembly 500 such that the two components maintain their relative position in the absence of a sufficient force imparted thereto, e.g., from a user forcing an adjustment of their relative positions.

In some examples, the ball and socket joint assembly 500 includes an actuator shaft 518 extending proximally from the housing 501, with the actuator shaft 518 extending into the cavity 505 and coupled to the compression member 530. The actuator shaft 518 is able to rotate and translate with respect to the housing 501 and the actuator shaft 518 can be used to position the compression member 530 with respect to the cam pin 550. For example, when the compression member 530 is sprung distally, torque applied to the actuator shaft 518 can rotate the compression member 530 to use the cam pin 550 as a thread in the angled channel 539 and advance the compression member 530 distally to collapse the collet 508 around the ball-shaped end 520, creating a friction fit. This cam pin 539 and angled track 539 design can be replaced with a partial thread in some embodiments.

FIG. 5B shows the ball and socket joint assembly 500 in a loading/unloading position. During a loading or connecting operation, this position will be achieved by pushing the ball-shaped end 520 into the collet 508, forcing it proximally until the fingers of the collet 508 are able to flex radially outwards (i.e., into the space provided by the proximal inner wall 503 of the cavity 505) and accept the ball-shaped end 520. During an unloading or disconnecting operation, the position of FIG. 5B is achieved by pulling proximally on the actuator shaft 518 and overcoming the spring force. At this point the fingers of the collet 508 can flex radially outwards and the ball-shaped-end 520 can be pulled out of the compression member 530.

Figure 6:
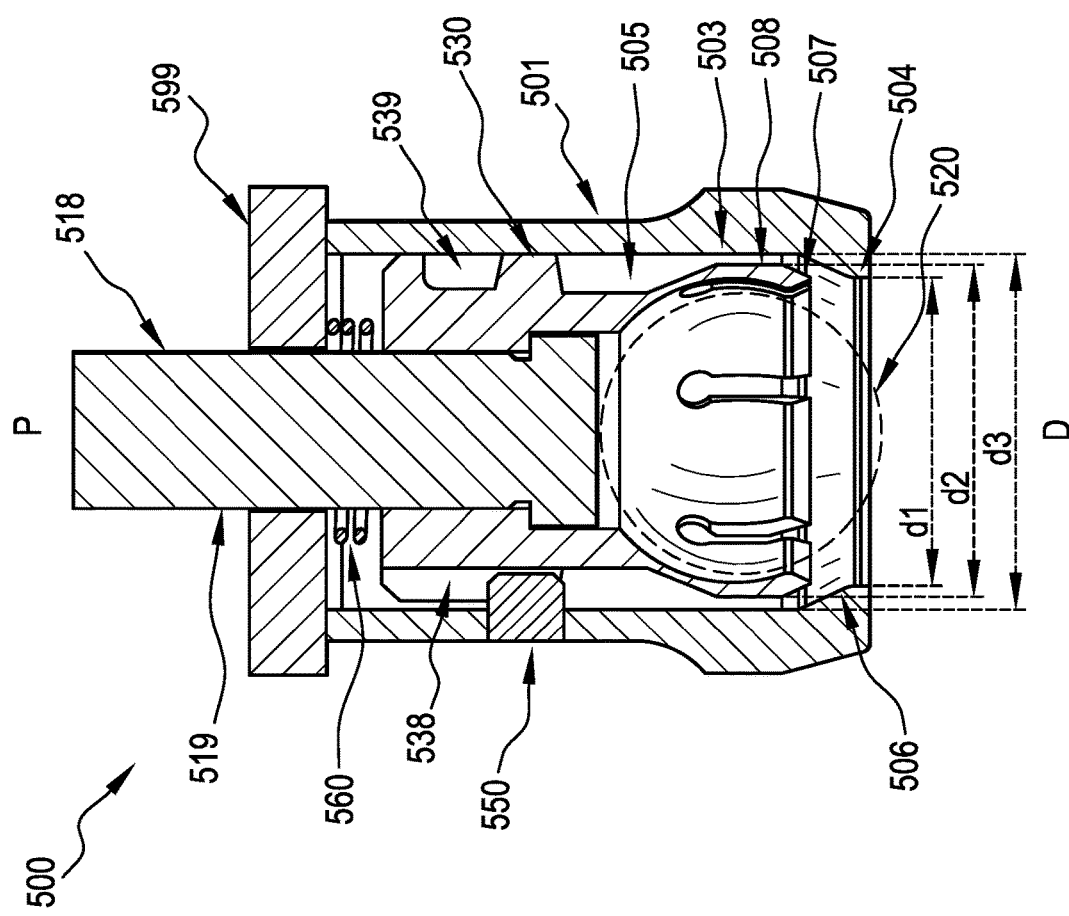
FIG. 6 is a cross-sectional view of the ball and socket assembly of FIGS. 5A and 5B.

FIG. 6 is a cross-sectional view of the ball and socket joint assembly 500 of FIGS. 5A and 5B. The ball and socket joint assembly 500 is shown in cross-section in the loading/unloading position with the ball-shaped end 520 (shown in phantom by dotted line) of the connector 502 disposed in the collet 508. The inner diameter of the cavity 505 is label d3, the outer diameter of the collet 508 is labeled d2, and the inner diameter of the lip 504 is labeled d1. In some examples, the inner diameter d3 of the cavity 505 is larger than the outer diameter d2 of the collet 508 at a proximal inner wall region 503 of the cavity 505 to allow the collet 508 to expand radially outward and allow the ball-shaped end 520 to be inserted and removed from the collet 508. In some examples, the outer diameter d2 of the collet 508 is larger than the diameter d1 of the opening of the cavity 505 as defined by the lip 504. The ball and socket joint assembly 500 can also include a cap 599 to cover a proximal end of the housing 501, and the cap 599 can be, for example, pressed, threaded, or otherwise connected to the proximal end of the housing 599, for example to cover a proximal opening of the housing 501 that is used to insert the compression member 530 into the housing 501. In operation, the cap 599 also allows the actuator shaft 518 to pass into the housing 501 to be coupled with the compression member 530, and the actuator shaft can include a circular section 519 arranged to constrain rotation of the actuator shaft 518 in the cap 599 to a longitudinal axis of the assembly 500. In some examples, the cap 599 is sealed to the housing 501, and the circular section 519 of the actuator shaft 518 can be coupled to the cap 599 while still allowing both rotation and translation of the actuator shaft 518 with respect to the housing 501.

In some examples, and as illustrated, the collet 508 extends beyond and around a midpoint (i.e., a maximum diameter location) of the ball-shaped end 520, such that the collet 508 passively retains the ball-shaped end 520. Additionally, in some examples, the distal outer surface 507 of the collet 508 is sloped such that, when the collet 508 is advanced distally against the lip 504, the lip 504 imparts both a radially inward and proximal force on the collet 508 to retain the ball-shaped end 520 in the collet 508. This diameter d1 of the lip 504 can be smaller than the outer diameter d2 of the collet 508 at a location distal to the midpoint (i.e., a maximum diameter location) of the ball-shaped end 520. In some examples, and as illustrated, the lip 504 can include a conical or sloped region 506 to increase the surface area over which the distal outer surface 507 of the collet 508 engages the lip 504.

FIGS. 7A and 7B are partially-transparent detail views of the ball and socket joint assembly 500 of FIGS. 5A and 5B showing a locking operation. In FIG. 7A, with the ball-shaped end 520 (shown in phantom by dotted line) disposed in the collet 508, the actuator shaft 518 is rotated (arrow 592) to advance the cam pin 550 out of the axial channel 538 and into the angled channel 539. This rotation 592 of the actuator shaft 518 drives the collet 508 distally with significant mechanical advantage against the lip 504, until the collet 508 cannot be driven further distally, at which point a significant friction fit exists between the collet 508 and the lip 504, which securely holds the ball-shaped end 520 in the collet 508.

In FIG. 7B the ball and socket joint assembly 500 is shown in a locked configuration, near the end of the travel of the cam pin 550 in the angled channel 539. Interference shown between the collet 508 and the lip 504 of the housing 501 indicates that the collet 508 has been deflected upon interference with the interior cone 506 of the lip 504 to secure the ball-shaped end 520 in the collet 508. This collapse, forced by the mechanical advantage of the threaded connection, creates a friction lock on the ball-shaped end 520 (shown in phantom by dotted line) and can prevent rotation or other movement between the housing 501 and the connector 502. Additionally, when the cam pin is disposed in the angled channel 539 to a position that advances the collet 508 against the lip 504, the collet 508 is prevented from expanding radially outward, which prevents the ball-shaped end 520 from being removed from the collet 508 because removal of the ball-shaped end 520 would require the collet 508 to expand radially outward to a larger diameter than allowed by the lip 504. From this position, counter rotation of the actuator shaft 518 moves the compression member 530 proximally and disengages the collet 508 from the lip 504, which returns the ball and socket joint assembly 500 to the loading/unloading position of FIG. 5B, where the ball-shaped end 520 can be removed from the collet 508 and passed out of the opening 509 of the housing 501.

Figure 7C:
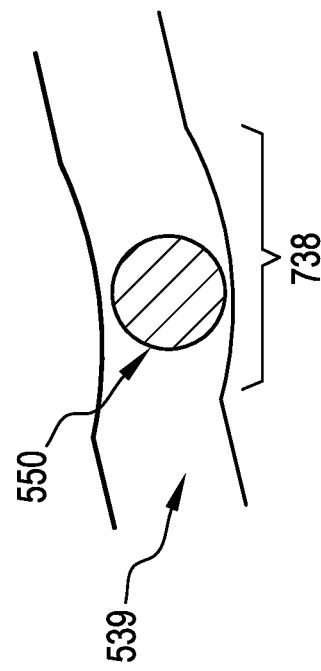
FIG. 7C is an illustration of the angled channel of FIGS. 7A and 7B having a straight section.
Figure 7D:
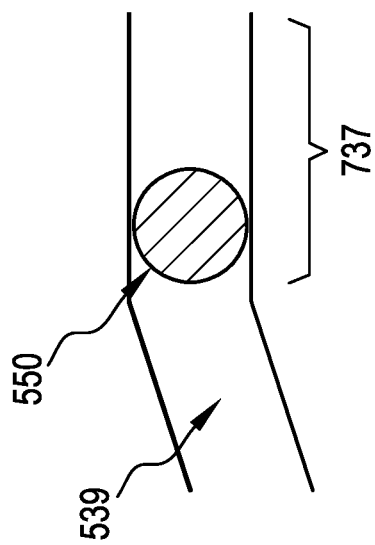
FIG. 7D is an illustration of the angled channel of FIGS. 7A and 7B having a divot.

In some instances, the degree of torque applied to the actuator shaft 518 determines the strength of the friction fit between the collet 508 and the lip 504, which in turn defines the strength of the hold that the collet 508 has on the ball-shaped end 520. Accordingly, a user can tighten the actuator shaft 518 to completely lock the ball-shaped end 520 in place in the collet 508, or to a degree which still allows for some resisted polyaxial movement of the ball-shaped end 520 in the collet 508. In some instances, and as shown in FIG. 7C, the angled channel 539 may have a straight section 737 or, as shown in FIG. 7D, the angled channel 539 can include one or more divots 738 at one or more circumferential locations, each of these being able to define predetermined friction levels as the user rotates the actuator shaft 518, where the straight sections 737 or divots 738 can also prevent any axial movement of the compression member 530 due to the force applied by the lip 504 against the collet in the proximal direction, thereby creating a passively locked retention position.

While a cam pin and track are used in the illustrated embodiments, a threaded connection can be used as well, provided the collet has an axial groove allowing the thread segment in the housing to travel freely. For example, the compression member 530 can be threaded into the housing 501 such that rotation of the compression member 530 translates the compression member 530 distally towards the lip 504 or proximally away from the lip 504. In operation, the actuator shaft 581 can be rotated to rotate the compression member 530 such that it is translated proximally to allow the ball-shaped end 520 to be received by the collet 508 and, afterwards, the actuator shaft 518 can be rotated in an opposite direction to rotate the compression member 530 such that the collet 508 is moved distally into contact with the lip 504 until the ball-shaped end 520 is locked and/or frictionally constrained by the collet 508. Alternatively, the compression member 530 can include an angled channel 538 without the axial channel 538 such that the rotation of the compression member 530 about the cam pin 550 translates the compression member 530 in the housing 501 between a proximal location where the collet 508 can accept the ball-shaped end 520 (e.g., as shown in FIG. 5B) and a distal location where the collet 508 locks the ball-shaped end 520 into the collet 508 (e.g., as shown in FIG. 7B). In some examples, the axial channel 538 functions to enable assembly of the compression member 530 into the housing 501 such that the cam pin first passes through an axial channel 538 during assembly and then moves into the angled channel 539 to be placed into an operational arrangement.

Figure 8:
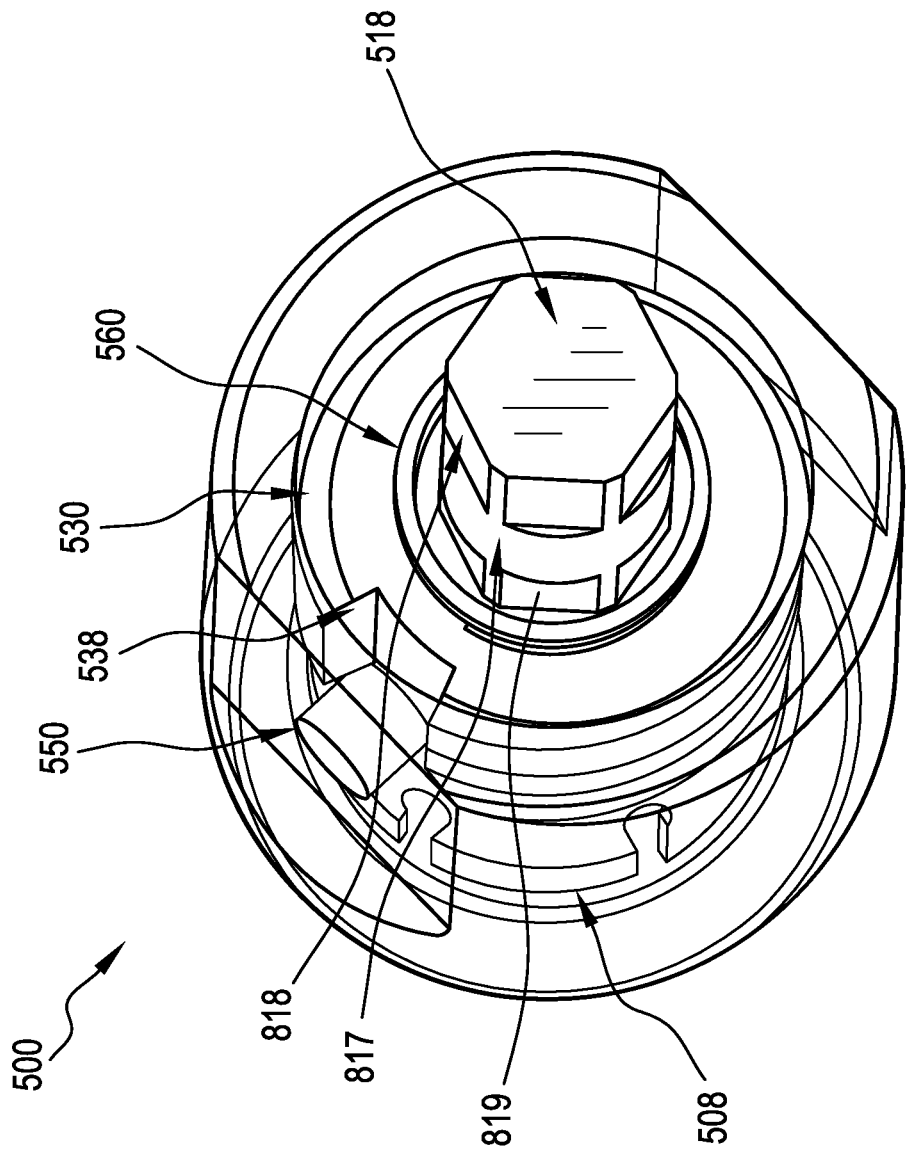
FIG. 8 is a perspective view of the of the polyaxial joint assembly of FIGS. 5A and 5B.

FIG. 8 is a perspective view of ball and socket joint assembly 500 of FIGS. 5A and 5B, with the proximal end cap 599 of the housing 501 removed. In FIG. 8, the cam pin 550 is shown extending into the axial channel 538. The actuator shaft 518 has a hexagonal profile along proximal and distal portions 818, 819 thereof. The proximal hexagonal section 818 can be used to connect to a handle or driver to enable a user to apply torque to the actuator shaft 518. This could be shaped like any driver feature or simply be a bent shaft (similar to an Allen key) to provide leverage. The distal hexagonal section 819 can be used to transfer torque from the actuator shaft 518 to the compression member 530, which can also be of any shape capable of applying torque. FIG. 8 shows the circular section 519 of the actuator shaft 518 is between the proximal and distal portion 818, 819 that is arranged to constrain rotation of the actuator shaft 518 in the cap 599.

FIG. 9A is an illustration of a retractor body 202 and tissue retractor implement arms 208, 210 of a surgical instrument assembly 900 being connected via a ball and socket joint assembly 500, with the body 202 having the housing 501 of the ball and socket assembly 500. In operation, each ball and socket joint 500 can be arranged to couple the body 202 to an arm 208, 210 that is itself coupled to, for example, a tissue manipulating implement 204, 206. The ball-shaped end 520 each connector 502 can be urged into the housing 501 attached to the body 202, and a compression member 530 in the housing 501 of the ball and socket joint assembly 500 can accept the ball-shaped end 520, as discussed with respect to FIGS. 5A-8. With the ball-shaped end 520 disposed in the collet 508 of the compression member 530, the arms 208, 210 can be polyaxially rotated about the housing 501. Additionally, with the ball-shaped end 520 disposed in the collet 508, the actuator shaft 518 can be rotated to translate the compression member 530 and lock the ball-shaped end 520 in the assembly 500 and frictionally restrain the polyaxial position of the arm 208, 210 with respect to the body 202 to a degree that can depend on the degree of rotation of the actuator shaft 518. Similarly, with the ball-shaped end 520 disposed into the collet 508, the actuator shaft 518 can be rotated in a direction opposite that used to lock the ball-shaped end 520 to unlock the assembly 500 such that the ball-shaped end 520 can be urged out of the compression member 530 to disconnect the arm 208, 210 from the body 202. In the configuration of FIG. 9A, rotation and actuation occurs on the retractor body 202 rather than the arms 208, 210 of the retractor blades, as shown in FIG. 9B, where the housing 501 is coupled to the arms 208, 210.

FIG. 9B is an illustration of a retractor body 202 and tissue retractor implement arms 208, 210 of a surgical instrument assembly 900 being connected via a ball and socket joint assembly 500, with the body 202 having the connectors 502 (as opposed to the arms 208, 210 having the connectors 502, as shown in FIG. 9A). In operation, each ball and socket joint 500 can be arranged to couple the body 202 to an arm 208, 210 that is itself coupled to, for example, a tissue manipulating implement 204, 206. The ball and socket joint assembly 500 can be urged against the ball-shaped end 520 of a connector 502 attached to the body 202, and a compression member 530 in the housing 501 of the ball and socket joint assembly 500 can accept the ball-shaped end 520, as discussed with respect to FIGS. 5A-8. With the ball-shaped end 520 disposed in the collet 508 of the compression member 530, the arms 208, 210 can be polyaxially rotated about the ball-shaped end 520. Additionally, with the ball-shaped end 520 disposed in the collet 508, the actuator shaft 518 can be rotated to translate the compression member 530 and lock the ball-shaped end 520 in the assembly 500 and frictionally restrain the polyaxial position of the arm 208, 210 with respect to the body 202 to a degree that can depend on the degree of rotation of the actuator shaft 518. Similarly, with the ball-shaped end 520 disposed into the collet 508, the actuator shaft 518 can be rotated in a direction opposite that used to lock the ball-shaped end 520 to unlock the assembly 500 such that the ball-shaped end 520 can be urged out of the compression member 530 to disconnect the arm 208, 210 from the body 202.

It should be noted that any ordering of method steps expressed or implied in the description above or in the accompanying drawings is not to be construed as limiting the disclosed methods to performing the steps in that order. Rather, the various steps of each of the methods disclosed herein can be performed in any of a variety of sequences. In addition, as the described methods are merely exemplary embodiments, various other methods that include additional steps or include fewer steps are also within the scope of the present disclosure.

The instruments disclosed herein can be constructed from any of a variety of known materials. Exemplary materials include those which are suitable for use in surgical applications, including metals such as stainless steel, titanium, nickel, cobalt-chromium, or alloys and combinations thereof, polymers such as PEEK, ceramics, carbon fiber, and so forth. The various components of the instruments disclosed herein can have varying degrees of rigidity or flexibility, as appropriate for their use. Device sizes can also vary greatly, depending on the intended use and surgical site anatomy. Furthermore, particular components can be formed from a different material than other components. One or more components or portions of the instrument can be formed from a radiopaque material to facilitate visualization under fluoroscopy and other imaging techniques, or from a radiolucent material so as not to interfere with visualization of other structures. Exemplary radiolucent materials include carbon fiber and high-strength polymers.

The devices and methods disclosed herein can be used in minimally-invasive surgery and/or open surgery. While the devices and methods disclosed herein are generally described in the context of spinal surgery on a human patient, it will be appreciated that the methods and devices disclosed herein can be used in any of a variety of surgical procedures with any human or animal subject, or in non-surgical procedures.

The devices disclosed herein can be designed to be disposed of after a single use, or they can be designed to be used multiple times. In either case, however, the device can be reconditioned for reuse after at least one use. Reconditioning can include any combination of the steps of disassembly of the device, followed by cleaning or replacement of particular pieces, and subsequent reassembly. In particular, the device can be disassembled, and any number of the particular pieces or parts of the device can be selectively replaced or removed in any combination. Upon cleaning and/or replacement of particular parts, the device can be reassembled for subsequent use either at a reconditioning facility, or by a surgical team immediately prior to a surgical procedure. Those skilled in the art will appreciate that reconditioning of a device can utilize a variety of techniques for disassembly, cleaning/replacement, and reassembly. Use of such techniques, and the resulting reconditioned device, are all within the scope of the present application.

The devices described herein can be processed before use in a surgical procedure. First, a new or used instrument can be obtained and, if necessary, cleaned. The instrument can then be sterilized. In one sterilization technique, the instrument can be placed in a closed and sealed container, such as a plastic or TYVEK bag. The container and its contents can then be placed in a field of radiation that can penetrate the container, such as gamma radiation, x-rays, or high-energy electrons. The radiation can kill bacteria on the instrument and in the container. The sterilized instrument can then be stored in the sterile container. The sealed container can keep the instrument sterile until it is opened in the medical facility. Other forms of sterilization known in the art are also possible. This can include beta or other forms of radiation, ethylene oxide, steam, or a liquid bath (e.g., cold soak). Certain forms of sterilization may be better suited to use with different portions of the device due to the materials utilized, the presence of electrical components, etc.

One skilled in the art will appreciate further features and advantages based on the above-described embodiments. Accordingly, the disclosure is not to be limited by what has been particularly shown and described. All publications and references cited herein are expressly incorporated herein by reference in their entirety.

What is claimed is:

1. A method of operating an assembly to couple a connector with a housing of the assembly, comprising:
    inserting a spherical portion of a proximal end of a connector into a cavity of the housing by passing the spherical portion through a distal opening of the housing;
    urging the spherical portion of the connector into a collet arranged on a distal end of a compression member within the cavity, the collet defining an outer diameter that is larger than a diameter of the distal opening in the housing when the spherical portion is disposed in the collet;
    rotating the compression member within the cavity and about a central longitudinal axis of the opening to induce translation of the compression member within the cavity along the central longitudinal axis in the distal direction and prevent translation in the proximal direction, and
    further rotating the compression member to induce translation of the collet and compress the collet inwardly against the spherical portion such that the collet prevents removal of the spherical portion from the collet and housing.

2. The method of claim 1, wherein the collet captures a maximum diameter location of the spherical portion of the connector.

3. The method of claim 1, wherein urging the spherical portion of the connector into the collet comprises translating the collet proximally.

4. The method of claim 1, wherein the distal opening has a diameter larger than a diameter of a spherical portion of the connector and less than a diameter of an inner wall of the cavity proximal to the distal opening.

5. The method of claim 1, wherein the cavity defines an outwardly tapered inner wall region extending proximally from the distal opening.

6. The method of claim 5, wherein compressing collet inwardly against the spherical portion comprises deflecting a plurality of resilient fingers, each having a tapered exterior surface interfacing with the outwardly tapered inner wall region of the cavity, as the compression member is advanced distally.

7. The method of claim 1, wherein rotating the compression member within the cavity comprises rotating an actuator shaft extending through a proximal end of the housing, the actuator shaft coupled to the compression member and permitting rotation and translation of the compression member within the cavity.

8. The method of claim 1, wherein the assembly defines a first configuration, in which the compression member is free to translate along the central longitudinal axis, and a second configuration, in which rotation of the compression member is converted into translation of the compression member along the longitudinal axis.

9. The method of claim 8, wherein the compression member comprises an angled locking channel sized and shaped to receive an engagement feature of the housing extending into the cavity in the second configuration.

10. The method of claim 9, wherein the angled locking channel defines a variable pitch to provide a variable mechanical advantage during rotation of the compression member with respect to the engagement feature when the engagement feature is disposed in the angled locking channel.

11. The method of claim 8, wherein translation of the compression member in the cavity comprises an engagement feature of the housing freely translating within an axial channel in an outer surface of the compression member, such that the compression member moves freely along the longitudinal axis in the cavity in the first configuration.

12. The method of claim 11, wherein a spring disposed in the housing and coupled to both the housing and the compression member biases the compression member towards the distal opening.

13. The method of claim 12, wherein the spring is configured to urge the collet against the distal opening.

14. The method of claim 1, wherein the compression member is threadably coupled to the housing during at least a portion of the rotating.

15. The method of claim 1, wherein urging the spherical portion into the collet passively secures the spherical portion of the connector before engagement of the collet with the distal opening of the housing.

16. A method, comprising:
- inserting a spherical portion of a connector into a collet of a compression member disposed within a cavity of a body, the spherical portion passing through a distal opening to the cavity that has a diameter larger than a diameter of the spherical portion and less than a diameter of an inner wall of the cavity proximal to the opening;
- rotating the compression member with respect to an engagement feature of the body, the engagement feature interfacing with the compression member such that the rotation of the compression member urges the compression member distally within the cavity; and
- continuing to rotate the compression member until an outer surface of the collet is compressed against the opening of the cavity and an inner surface of the collet is compressed around the spherical portion to retain the spherical portion in the collet.

17. The method of claim 16, wherein inserting the spherical portion into the collet includes urging the compression member proximally against a spring force, wherein the spring force urges the compression member distally towards the opening after the inserting.

18. The method of claim 17, wherein the spring force urges the collet distally against the distal opening and imparts a provisional retaining force to the spherical portion.

19. The method of claim 18, wherein the provisional retaining force serves to impart a drag force on the spherical portion to resist polyaxial movement of the spherical portion about the collet.

20. The method of claim 16, wherein continuing to rotate the compression member includes adjusting a degree of frictional resistance to polyaxial movement of the spherical portion in the collet.

21. The method of claim 16, further comprising rotating the compression member in a second direction to urge the compression member proximally in the cavity until the spherical portion can be removed from the collet and pass through the distal opening of the cavity.

* * * * *